A. RIEMANN.
TIRE PROTECTOR.
APPLICATION FILED MAR. 7, 1914.
1,111,095.
Patented Sept. 22, 1914.
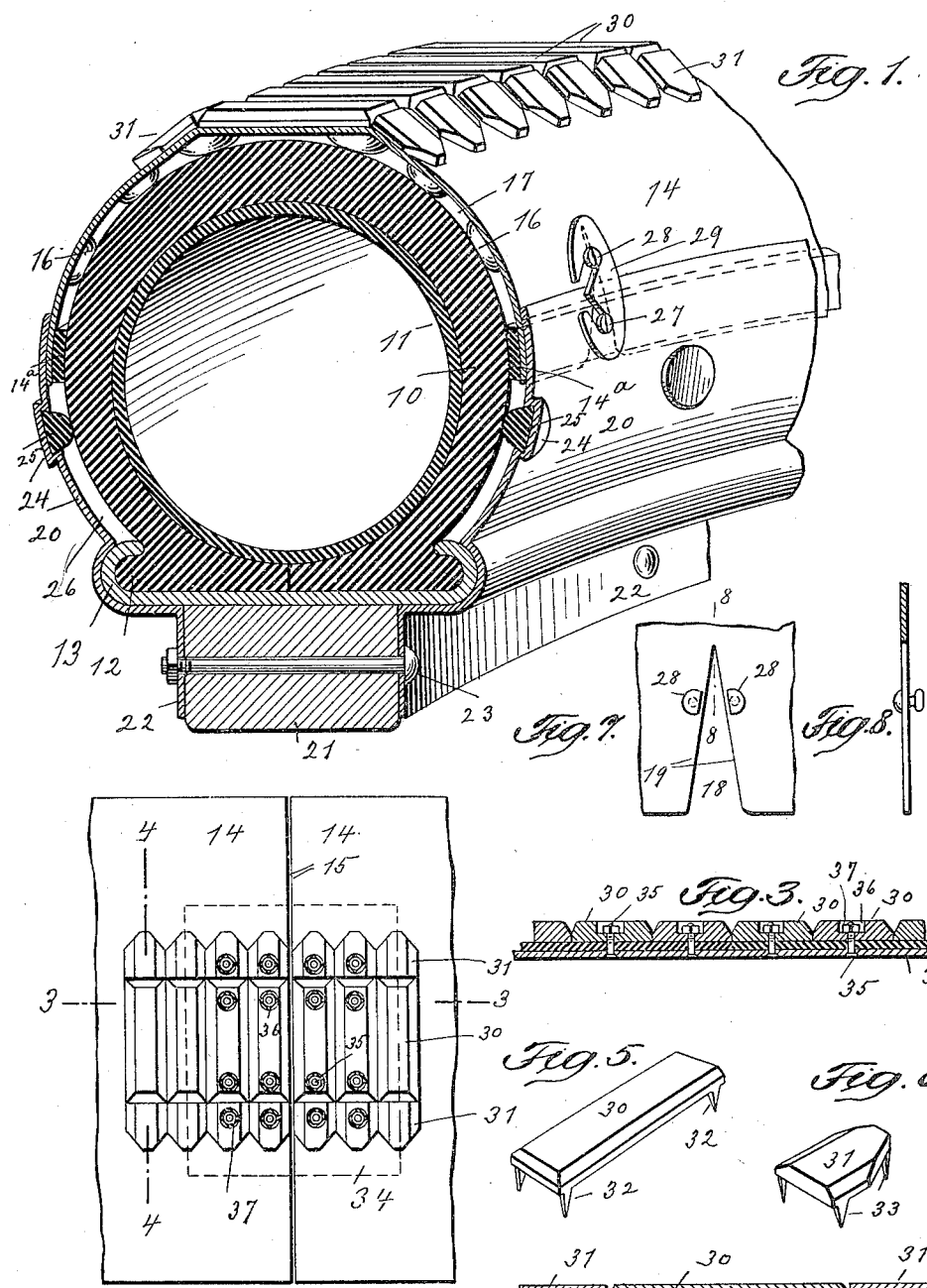

UNITED STATES PATENT OFFICE.

AUGUSTE RIEMANN, OF NEW YORK, N. Y.

TIRE-PROTECTOR.

1,111,095.  Specification of Letters Patent.  Patented Sept. 22, 1914.

Application filed March 7, 1914. Serial No. 823,079.

*To all whom it may concern:*

Be it known that I, AUGUSTE RIEMANN, a citizen of Germany, residing at 305 West Fifty-fifth street, New York city, county and State of New York, have invented certain new and useful Improvements in Tire-Protectors, of which the following is a specification.

This invention relates to a tire protector of novel construction which incases the tire tube in a dust- and water proof manner, permits the tube to be laterally deflected under load pressure without encountering frictional contact with the protector, is rigidly secured to the wheel rim, and effectively armors the tube against punctures.

In the accompanying drawing: Figure 1 is a perspective view of part of a tire protector embodying my invention; Fig. 2 a detail of the abutting strip-ends and adjoining parts; Fig. 3 a section on line 3, 3, Fig. 2; Fig. 4 a section on line 4, 4, Fig. 2; Fig. 5 a perspective view of one of the central armor bars; Fig. 6 a similar view of one of the lateral armor bars; Fig. 7 a detail of a gored portion of the flexible strip, and Fig. 8 a section on line 8, 8, Fig. 7.

The outer tire tube 10 inclosing the air tube 11, is flanged as at 12 for engagement with the wheel rim 13. Over the outer half or tread of tire 10, there extends a flexible covering 14, made preferably of a continuous strip of leather, the edges of which abut as at 15, Fig. 2, said edges being joined to each other, in manner described farther below. To the inner face of strip 14, there are secured at suitable points a number of rubber protuberances 16 shown to be made in the shape of conical plugs, though this shape may be varied without departing from the spirit of my invention. Plugs 16 contact with the face of tube 10, and thus produce intermediate said tube and strip 14, an air space 17, that prevents a direct frictional engagement between tube and strip, rubber fillets 14ᵃ being interposed between the tube and the ends of the strip. The two longitudinal edges of strip 14, are gored at suitable intervals as at 18, and the transverse edges 19 thus formed are drawn together, so as to closely hug fillets 14ᵃ.

The inner or wheel portion of tube 10, is encompassed by a sectional steel or other sheet metal casing 20 the halves of which are joined to each other and to the wheel felly 21 in suitable manner, the drawing showing them to be provided with flanges 22 which are perforated for the reception of bolts 23, said bolts passing likewise through felly 21. Casing 20, is provided on its inner face with a plurality of sockets 24, into which are fitted rubber plugs or protuberances 25, that engage with their protruding ends the body of tube 10, so that here also an air space 26 is made to intervene between tube and casing. The two longitudinal edges of casing 20, overlap the gored and contracted ends of strip 14, and are provided with buttons 27, arranged opposite sectional buttons 28, which are provided on opposite sides of gore 18, so as to be drawn together by the contraction of the gore. Each pair of opposed buttons 27, 28 is engaged by a common clasp 29, that projects over the junction between casing 20, and strip 14, and has two hooks, one of which encircles button 27 while the other encircles the divided button 28. By means of the clasps 29, the two component parts of the tire protector are thus firmly united and sustained in their relative position, while by taking off the clasps, the protector may be readily dismembered.

Strip 14 is armored by a plurality of metal bars 30, extending transversely over the tread, and by two rows of shorter metal bars 31, fitted closely against the ends of bars 30, and located sidewise of the tread, the bars 30, being beveled along their edges to permit a free play under load pressure. Bars 30 are rectangular in shape and provided with integral prongs 32, while bars 31 are somewhat pointed and provided with prongs 33, the prongs 32, 33 being forced through the strip 14 and then upset, to secure the bars to the latter. Underneath the abutting edges 15 of strip 14, there is placed a leather underlay 34 from which extend outward a plurality of bolts 35, that pass through strip 14 and thence enter sockets 36 formed in those bars 30, 31, which are located near the break of strip 14. Nuts 37 engaging bolts 35 and countersunk in the sockets 36 serve to attach the underlay 34 to the bars, so that in this way the abutting ends of strip 14 are securely attached to each other while upon the unscrewing of the nuts, the strip can be readily removed.

The tire protector constructed as described possesses a number of advantages: The rubber plugs though permitting the play of the tube under load pressure, prevent any actual contact between tube and protector, so that objectionable friction is avoided. The steel casing effects a secure and rigid attachment of the device to the wheel rim, protects the tube against injury, and checks any lateral deflection of the same, while together with the leather strip it constitutes a dust- and watertight inclosure for the tube. The metal bars constitute a reliable armor against nails, glass or similar articles, and owing to their tripartite construction will yield readily and may be applied to tubes of various diameters without requiring a corresponding change in their length. Finally the protector may be quickly applied and removed, and all of its parts are readily accessible for the purposes of inspection and repair.

I claim:

1. A tire protector comprising a metal casing fitted against the inner side of a tire tube, a flexible strip fitted against the outer side of said tube and having gored longitudinal edges which are overlapped by the longitudinal edges of the casing, sectional buttons secured to the strip at opposite sides of the gores, coöperating buttons secured to the casing, and clasps engaging the buttons of the strip and casing.

2. A tire protector comprising a flexible strip adapted to encompass one portion of a tire tube, an overlapping metal casing adapted to encompass another portion of said tube, means for securing the strip to the casing, and resilient plugs projecting from the inner faces of the strip and casing into contact with the tube.

AUGUSTE RIEMANN.

Witnesses:
 FRANK V. BRIESEN,
 MADELINE HIRSCH.

Copies of this patent may be obtained for five cents each, by addressing the "Commissioner of Patents, Washington, D. C."